(12) United States Patent
Dubash et al.

(10) Patent No.: US 9,214,972 B2
(45) Date of Patent: Dec. 15, 2015

(54) METHOD AND APPARATUS FOR ON-DEMAND INTERFERENCE REJECTION IN MULTI-BAND GNSS RECEIVERS

(71) Applicant: CAMBRIDGE SILICON RADIO LIMITED, Cambridge (GB)

(72) Inventors: Noshir Dubash, Phoenix, AZ (US); Joakim Landmark, Phoenix, AZ (US)

(73) Assignee: QUALCOMM TECHNOLOGIES INTERNATIONAL, LTD., Cambridge (GB)

( * ) Notice: Subject to any disclaimer, the term of this patent is extended or adjusted under 35 U.S.C. 154(b) by 110 days.

(21) Appl. No.: 13/916,883

(22) Filed: Jun. 13, 2013

(65) Prior Publication Data

US 2014/0369452 A1    Dec. 18, 2014

(51) Int. Cl.
*H04B 1/10* (2006.01)
*H04B 1/16* (2006.01)
*G01S 5/00* (2006.01)

(52) U.S. Cl.
CPC .............. *H04B 1/1036* (2013.01); *G01S 5/00* (2013.01)

(58) Field of Classification Search
USPC ............. 455/67.11, 67.13, 179.1, 226.1, 266, 455/296, 307; 375/346, 350
See application file for complete search history.

(56) References Cited

U.S. PATENT DOCUMENTS

| | | | |
|---|---|---|---|
| 5,678,169 A | | 10/1997 | Turney |
| 7,257,380 B2 * | | 8/2007 | Darabi et al. .................. 455/73 |
| 8,442,473 B1 * | | 5/2013 | Kaukovuori et al. ......... 455/323 |
| 8,515,371 B2 * | | 8/2013 | Leme et al. ................ 455/189.1 |
| 8,666,326 B2 * | | 3/2014 | Chien ......................... 455/73 |
| 2006/0126702 A1 * | | 6/2006 | Burdett ........................ 375/136 |
| 2010/0302100 A1 * | | 12/2010 | Yang et al. ............... 342/357.73 |
| 2014/0080436 A1 * | | 3/2014 | Madadi et al. ................ 455/307 |
| 2014/0098839 A1 * | | 4/2014 | Wang et al. ................... 375/147 |

FOREIGN PATENT DOCUMENTS

| | | |
|---|---|---|
| GB | 2487973 | 8/2012 |
| GB | 2488970 | 9/2012 |

OTHER PUBLICATIONS

Search Report dated Dec. 2, 2014 in corresponding British application No. 1400095.4.
Yoshizawa et al, "A Channel-Select Filter With Agile Blocker Detection and Adaptive Power Dissipation," IEEE J. Solid-State Cir, vol. 43, No. 5, May 2007.

* cited by examiner

*Primary Examiner* — Blane J Jackson
(74) *Attorney, Agent, or Firm* — Mahamedi Paradice LLP (57) ABSTRACT

In general, the present invention relates to an adaptive IF filter for a multiband receiver. According to certain aspects, the adaptive IF filter can be dynamically configured as a low-pass architecture or a complex band-pass architecture. According to further aspects, the adaptive IF filter enables a wideband receiver which can simultaneously receive multiple frequency bands, but still protect itself from close-in or in-band jammers by selecting a single frequency band or subset of frequency bands. This retains the multiband functionality of the receiver under nominal conditions, which is traded off dynamically for a single-frequency-band with high jammer resistance under severe jamming conditions. According to still further aspects, the approach of the invention is particularly useful for GNSS receivers, since unlike a cellular transceiver, a temporary loss of signal is not catastrophic to GNSS receivers due to the long integration times.

19 Claims, 5 Drawing Sheets

METHOD AND APPARATUS FOR ON-DEMAND INTERFERENCE REJECTION IN MULTI-BAND GNSS RECEIVERS

FIELD OF THE INVENTION

The present invention relates generally to multiband RF receivers, and more particularly to methods and apparatuses for multiband GNSS receivers with on-demand RF interference rejection.

BACKGROUND OF THE INVENTION

Figure 1A:
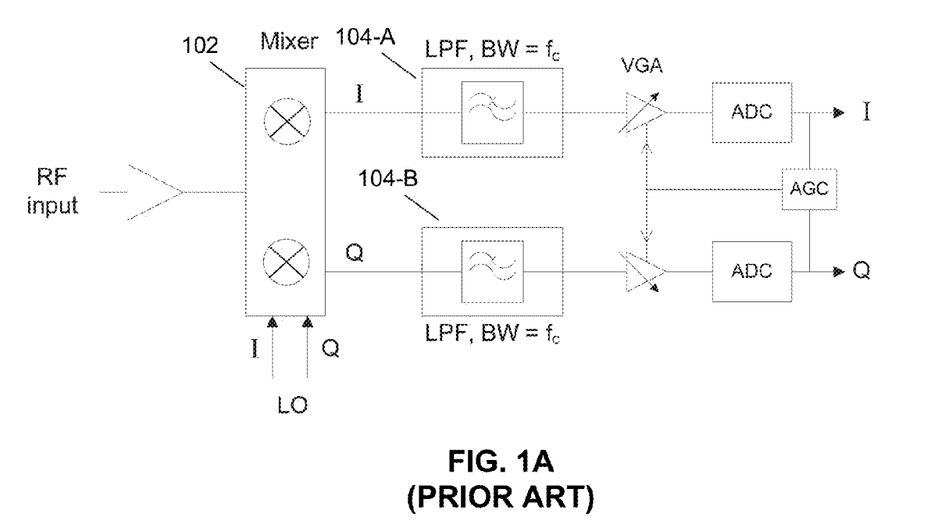
FIGS. 1A and 1B illustrate prior art implementations of a wideband IF filter.
Figure 1B:
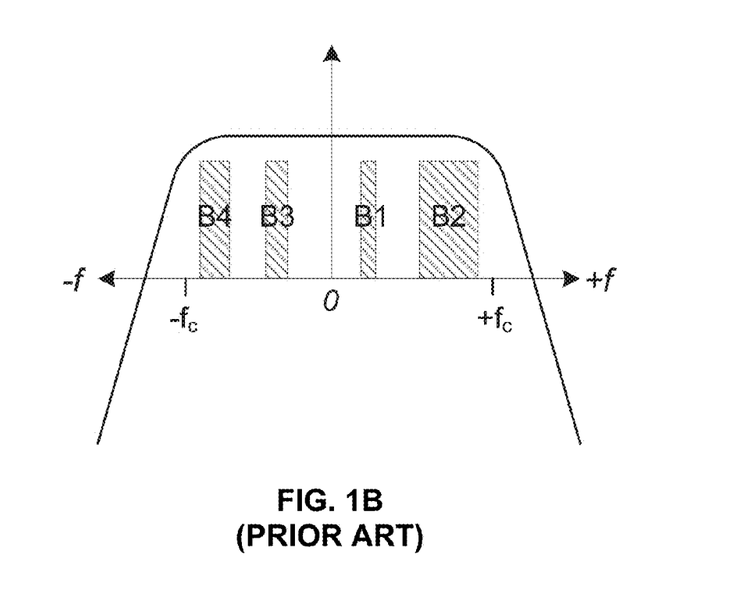

Global Navigation Satellite Systems (GNSS) available today or in the near future include GPS, GLONASS, BeiDou Satellite Navigation System (BDS, formerly known as Compass) and Galileo. Multiband GNSS receivers that support multiple systems offer a performance advantage due to the increased number of satellites in view. Conventionally, this is done by providing parallel receiver paths for the different bands, which requires more power and hardware. A more efficient way to architect a multiband GNSS receiver, although not typically done today, would be to have a single down-conversion with a large IF bandwidth that includes all the bands of interest, as shown in FIGS. 1A and 1B. For example, FIG. 1B shows bands B1, B2, B3, and B4 representing four respective frequency bands from different GNSS systems (e.g. GPS, GLONASS, BDS and Galileo) after downconversion to IF by mixer 102. These are all preserved by a wide passband having bandwidth $2*f_c$ established by low pass filters 104-A and 104-B. The individual bands B1, B2, B3 and B4 are then separated by high-speed filtering and processing in the digital domain, which is very efficient in current digital CMOS technology.

One problem with a large IF bandwidth is that it leaves the receiver vulnerable to interference close to the GNSS bands, such as that caused by jammers, due to the limited rejection of a wideband IF filter. There are several existing approaches to making RF receivers more resistant to in-band or close-in RF interference.

Narrower and higher rejection front-end filters can be used in front of the LNA to reject or attenuate the jammer. However, this would only work for a single frequency band receiver. Furthermore, higher rejection and narrower band filters would generally have higher cost and higher insertion loss. Higher insertion loss limits the receiver's sensitivity.

Double-conversion RF receivers for one or more frequency bands can be used to separate the IF signal paths of each frequency band. Each frequency band then has its own IF filter that can be tuned to reject the jammer. This approach increases chip area and power consumption due to duplication of the IF filters, VGA and ADC functions for each frequency band. The LO's used for the second down-conversion mixers are also a source of spurious self-interference in the receiver as their harmonics can mix with the reference frequency and couple to the receiver's RF input.

A high dynamic range ADC can be used to reduce the total receiver gain and thus increase headroom for the jammer signal. This increases the ADC power consumption and sampling frequency. For wide-band IF signals the demands on the ADC get increasingly higher, which puts a limit on how much the dynamic range of the ADC can be increased. For a multiband receiver with a limited power budget, this alone is not sufficient to provide the required jamming immunity.

Increasing current in the IF filters and amplifier can increase the linearity and compression point of these stages, thus enabling the receiver to withstand a higher jammer level before compression and performance degradation. However, this is only an incremental improvement and signal headroom will ultimately be limited by the supply voltage rails. This method also costs additional current. Adjustable biasing has been proposed to minimize power when linearity is not required. See, e.g., Yoshizawa et al, A channel-select filter with agile blocker detection and adaptive power dissipation, IEEE J. Solid-State Cir, Vol 43, No 5, May 2007.

Accordingly, a need remains for efficient methods and apparatuses for multiband receivers with effective and flexible interference rejection, such as that caused by in-band or close-in jammers.

SUMMARY OF THE INVENTION

In general, the present invention relates to an adaptive IF filter for a multiband receiver. According to certain aspects, the adaptive IF filter can be dynamically configured as a low-pass architecture or a complex band-pass architecture. According to further aspects, the adaptive IF filter enables a wideband receiver which can simultaneously receive multiple frequency bands, but still protect itself from close-in or in-band jammers by selecting a single frequency band or subset of frequency bands. This retains the multiband functionality of the receiver under nominal conditions, which is traded off dynamically for a single-frequency-band with high jammer resistance under severe jamming conditions. According to still further aspects, the approach of the invention is particularly useful for GNSS receivers, since unlike a cellular transceiver, a temporary loss of signal is not catastrophic to GNSS receivers due to the long integration times. According to still further aspects, embodiments of the invention enable dynamic re-configuration of a receiver's low-pass IF filter into a complex band-pass filter using minimal additional hardware.

Embodiments of the invention provide a clear advantage in cost, performance and functionality over prior art methods. The invention can be used alone or can be used in conjunction with other conventional methods to significantly improve jamming immunity. Embodiments of the invention invention can adjust current in the LPF, but can actually decrease current consumption instead of increasing current as in prior art methods. When switched to a complex band-pass configuration the LPF filters are set to narrower bandwidth, which requires less current in than the wideband IF filter. According to certain aspects, embodiments of the invention offer the efficiency and versatility of single conversion multi-band receiver with a single wide IF band, which takes maximum advantage of state-of-the-art digital CMOS technology that is available for digital filtering and processing.

In furtherance of these and other aspects, an IF filter for a multiband GNSS receiver according to embodiments of the invention includes a wideband filter that passes a plurality of signals from different GNSS systems; and cross-coupling elements that convert the wideband filter into a narrowband filter that passes fewer than the plurality of signals.

In additional furtherance of these and other aspects, an IF filter for a multiband GNSS receiver according to embodiments of the invention includes a first lowpass Op Amp-RC filter coupled to in-phase signals corresponding to a plurality of different GNSS systems; a second lowpass Op Amp-RC filter coupled to quadrature signals corresponding to the plurality of different GNSS systems; and a switched resistor block operatively coupled between the first and second lowpass Op Amp-RC filters, wherein in a first mode of operation, the switched resistor block provides an open circuit between the first and second lowpass Op Amp-RC filters so that they together have a wide passband that passes signals from all of the plurality of GNSS systems, and wherein in a second mode of operation, the switched resistor block provides a resistive coupling between the first and second lowpass Op Amp-RC filters so that they together have a narrower passband that passes signals from fewer than all of the plurality of GNSS systems.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, embodiments of the invention are directed to an adaptive IF filter for a multiband receiver, which can be dynamically configured as a low-pass architecture or a complex band-pass architecture. The adaptive IF filter enables a wideband receiver which can simultaneously receive multiple frequency bands, but is also able to protect itself from close-in or in-band jammers by selecting a single frequency band or subset of frequency bands. According to certain aspects, embodiments of the invention accomplish this by dynamically re-configuring a receiver's low-pass IF filters to a complex band-pass filter, using minimal additional hardware.

Figure 2A:
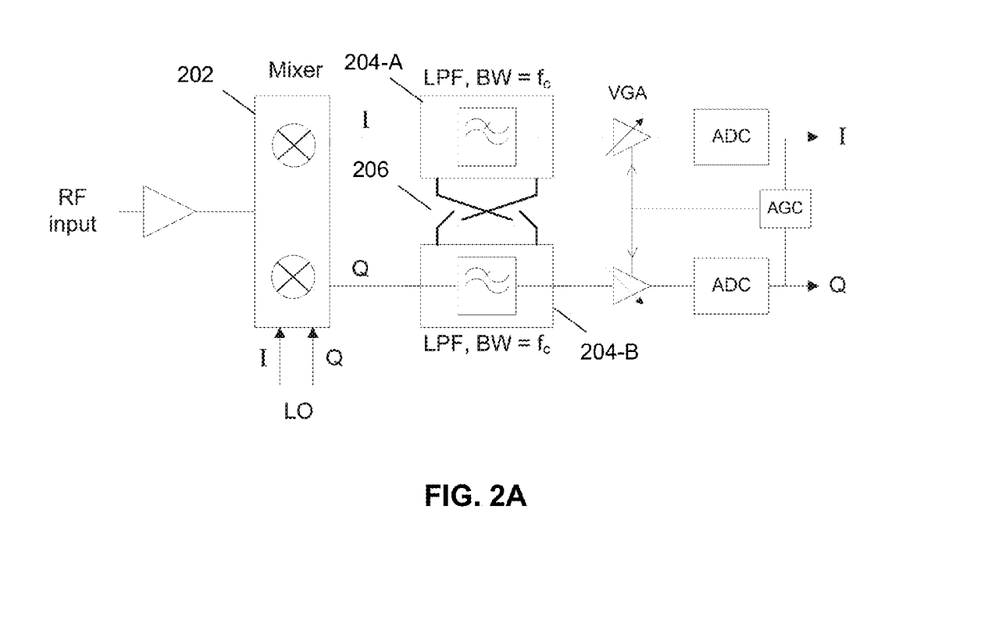
FIGS. 2A and 2B illustrate aspects of an adaptive IF filter according to the invention.
Figure 2B:
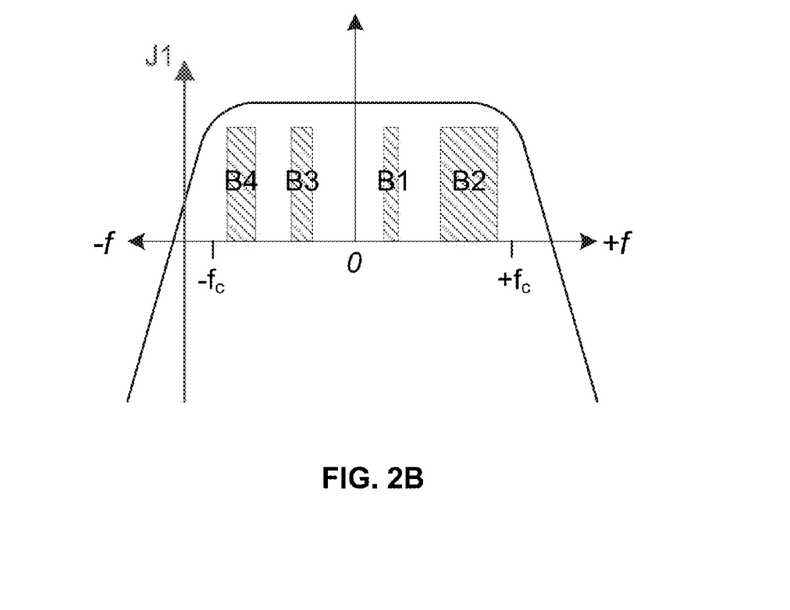

Example aspects of an adaptive IF filter according to embodiments of the invention are illustrated in FIGS. 2A and 2B. From a high-level standpoint, FIG. 2A shows a similar multiband receiver architecture as that in FIG. 1A, except that there are now programmable cross-coupled paths 206 between the I and Q low-pass filters 204-A and 204-B. Under nominal conditions (e.g. no destructive interference such as an in-band jammer) the switches in the cross-coupled paths 206 will be open and this receiver will still behave like the receiver in FIG. 1A, receiving all bands, as shown in FIG. 2B. In an example where the GNSS signals include GPS, GLONASS, BDS and Galileo, the bandwidth $2*f_c$ can be around 44 MHz.

Figure 3A:
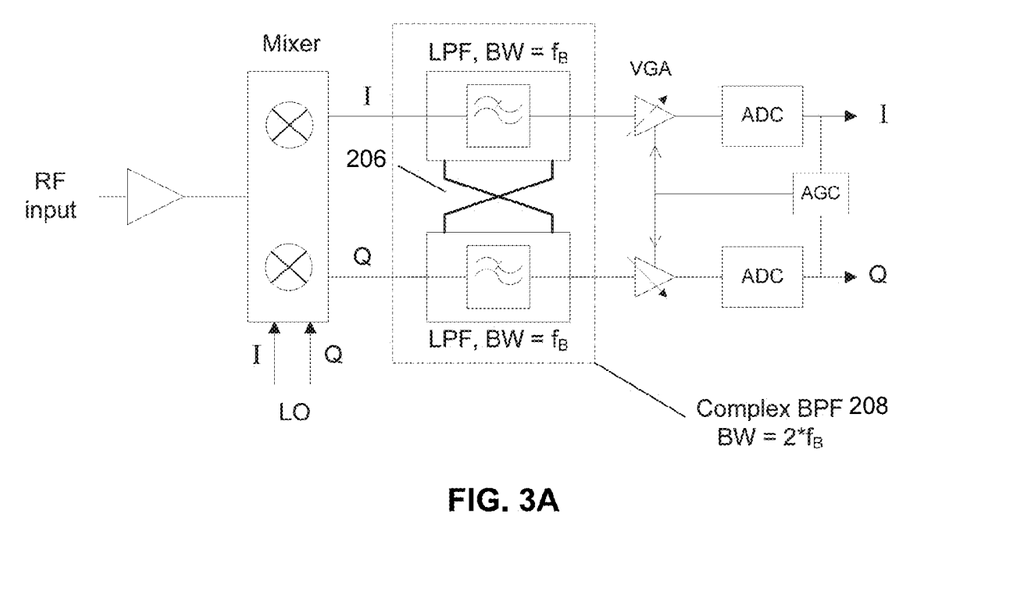
FIGS. 3A and 3B illustrate further aspects of an adaptive IF filter according to the invention.

Now assume that a large close-in jammer J1 is incident at the RF input, and is down-converted to negative IF frequency by mixer 202 along with the desired signals in B1, B2, B3 and B4, as shown in FIG. 2B. The jammer causes a large decrease in the AGC gain, which is typically computed by integrating and averaging the I and Q ADC data samples. This sudden large decrease in AGC gain triggers embodiments of the invention to decrease the LPF bandwidth from $f_C$ to $f_B$, and to close the switches in cross-coupling path 206. These two actions convert the wideband low-pass filters to a narrowband complex band-pass filter 208, as illustrated in FIG. 3A.

Figure 3B:
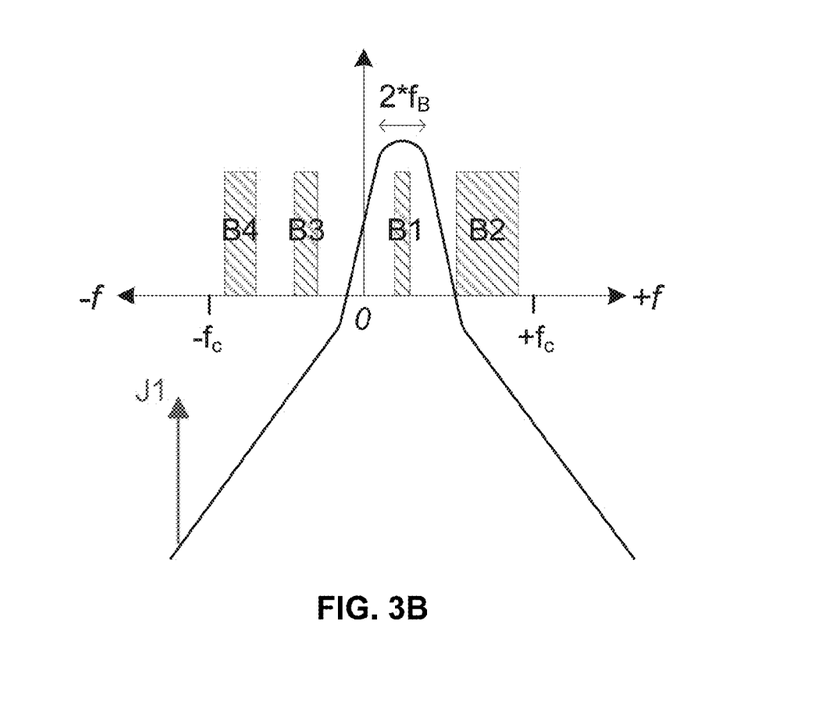

FIG. 3B shows how the interference from jammer J1 is greatly attenuated by the complex filter 208. Note that this is an approximate drawing for illustration purposes only. The actual frequency response and jammer attenuation achieved will depend on the order, bandwidth, and type of filter. Further note that, notwithstanding the illustration in FIG. 3B, the complex filter 208 can be designed to pass any one or more of the bands, as will be explained in more detail below. Still further, although FIG. 3B shows a positive shift in center frequency, similar negative frequency shifts can also be achieved by changing the cross-coupling polarity, or by swapping the I and Q signals in the mixer 202.

Figure 4:
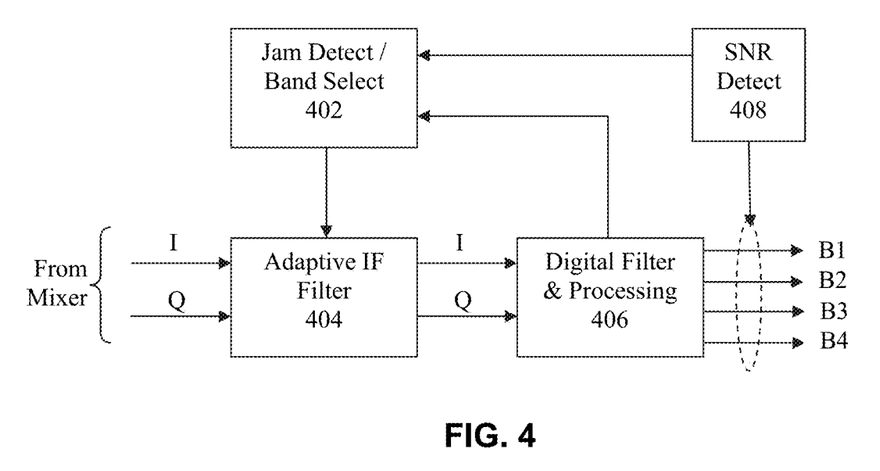
FIG. 4 is a functional block diagram illustrating an example implementation of an adaptive IF filter according to embodiments of the invention.

FIG. 4 is an example functional block diagram for implementing an adaptive IF filter according to embodiments of the invention.

As shown, it includes a jam detect and band select block 402, an adaptive IF filter 404, a digital filter and processing block 406 and a SNR detect block 408.

In normal operation, adaptive IF filter 404 is configured as conventional wideband low-pass filters, with digital filter and processing block 406 operating to separate out the digital baseband signals B1, B2, B3 and B4. Jam detect and band select block 402 receives real-time feedback signals from digital filter and processing block 406 (e.g. digital part of the AGC loop) and SNR detect block 408. For example, feedback from block 406 can include AGC gain control information and feedback from block 408 can include band-specific SNR information. This information can be used by block 402 to determine the presence and frequency of destructive interference, such as from an in-band or close-in jammer. In response, block 402 can send appropriate signals to adaptive filter 404 to cause it to be reconfigured as a narrowband band pass filter, with a center frequency set to greatly attenuate the destructive interference, as described above.

Jam detect and band select block 402 can be implemented by any combination of software, hardware, firmware, etc. In one example where adaptive IF filter 404 is included in a GNSS receiver, block 402 can be implemented by firmware for execution by a GNSS receiver processor such as a CPU core. Those skilled in the art will understand how to implement the functionality of block 402 after being taught by the present disclosure, and depending on the actual filter design, etc.

Digital filter and processing block 406 can be implemented in various ways known to those skilled in the art, and can include functional components such as CW detectors, digital filters, digital down converters for the separate baseband signals, FIR filters, etc. These can be implemented using any combination of software, hardware, firmware, etc., as appreciated by those skilled in the art. Further details thereof will be omitted here for sake of clarity of the invention. SNR detect block 408 can also be implemented by any combination of software and hardware to monitor the SNR for each individual band B1 to B4 and/or various other portions of the overall IF passband.

Figure 5:
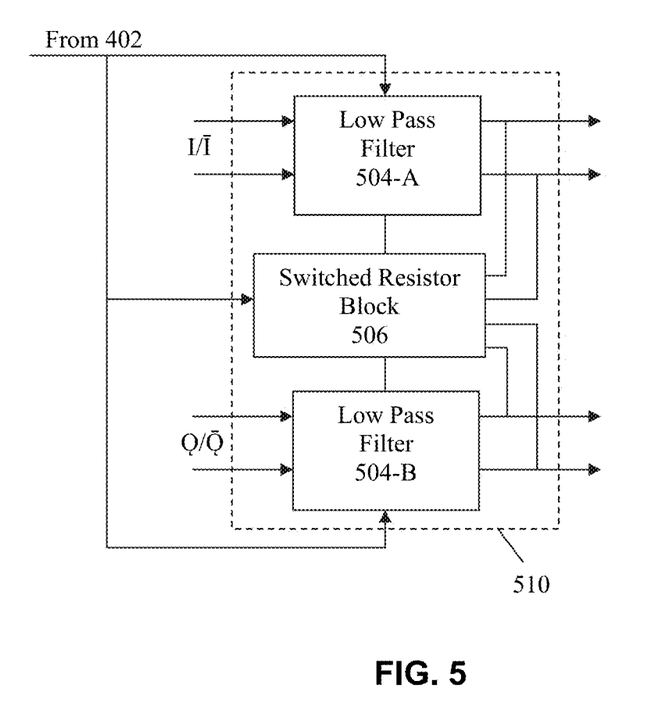
FIG. 5 is a functional block diagram further illustrating an example implementation of an adaptive IF filter according to embodiments of the invention.

FIG. 5 is a functional block diagram further illustrating an example implementation of adaptive IF filter 404 according to embodiments of the invention.

As shown, filter 404 in this example includes low pass filters 504-A and 504-B operatively coupled to switched resistor block 506.

In normal operation, switched resistor block 506 is configured to create an effective open circuit between low pass filter 504-A and 504-B, causing them to operate independently as wide-band IF filters. Depending on signals from jam detect/band select block 402, switched resistor block 506 and filters 504-A and 504-B can be dynamically reconfigured to operate as a complex narrowband filter 510.

In embodiments, switched resistor block 506 includes a plurality of resistors in series with switches implemented as NMOS transistors, representing the multiple cross-coupled paths. The number of cross-coupled paths is proportional to the order of the filters. The resistance is split into two parts so that both filters 504-A and 504-B see the same load. The switches are simultaneously opened and closed depending on control signals from block 402, thereby enabling or disabling the resistive cross-coupling paths between filters 504-A and 504-B. The resistors can be made variable to set to the center frequency of the complex bandpass filter, and may be programmed by a digital code from block 402.

The particular design and values of components in filters 504-A and 504-B and switched resistor block 506 will depend on the mixer LO frequency, the frequency and bandwidth of the RF signal bands, anti-aliasing requirements, and the desired interference rejection. Example implementations will be described in more detail below. Those skilled in the art will be able to implement the invention for various signal bands such as different GNSS signals after being taught by the examples below.

In embodiments, the design of filters 504-A and 504-B is started from the passive LC ladder prototype of the desired filter function (e.g. with the required cutoff frequencies, order, ripple, etc.). The type of filter function or frequency response may be Butterworth, Chebyshev, or other. The coefficients of the inductor (L) and capacitor (C) components of the LC prototype can be obtained from published tables, filter design programs, or derived analytically. Kirchoff's Current Law (KCL) and Kirchoff's Voltage Law (KVL) equations are then used to calculate the R and C values of the low-pass filters 504-A and 504-B, which in embodiments are implemented in Leapfrog topology.

The complex filter 510 is realized by first shifting the frequency of the low-pass filters 504 to be centered on the frequency of the desired baseband signal(s). If HLP(jω) is the transfer function of the low-pass filter 504, then the transfer function of the Complex Band-Pass filter 510, HCBP(jω) is given by:

$$H_{CBP}(j\omega)=H_{LP}[j(\omega-\omega_0)]$$

where $\omega_0$ is the frequency shift and $\omega$ is the frequency of the original wideband IF filter.

In the embodiment shown in FIG. 5, this shift in center frequency is achieved by cross-coupling the two low-pass filters 504-A and 504-B using switched resistor block 506. For OpAmp-RC filters this frequency shift can be achieved by resistors in the cross-coupling paths given by:

$$R_C = \frac{1}{\omega_0 C_0}$$

where $C_0$ is the capacitance of the integrator.

For simplicity, $C_0$ is identical for all the stages in the filter so that the coupling resistors are the same for all the cross-coupled paths through block 506. Note that the frequency shift can be made variable by making the cross-coupled resistors $R_C$ programmable. Digitally programmable variable resistors can be implemented using a combination of series or parallel resistors coupled to MOS switches, using methods known to those ordinarily skilled in the art. These variable resistors within block 506 may be controlled by signals from block 402. The direction of the frequency shift can be made positive or negative by inverting the I and Q cross coupling, or by swapping the I and Q phases in the mixer.

According to certain aspects, the bandwidth of complex filter 510 is also adjusted. In embodiments, this is accomplished by adjusting the capacitance of the integrator $C_0$. Variable capacitors may be easily implemented using multiple capacitors coupled to switches.

Embodiments of the invention use a Leapfrog OpAmp-RC topology for the low-pass filters 504 which offers high linearity. This topology is suitable for any odd order filter with three or more poles (third order, fifth order, seventh order, etc.).

Figure 6:
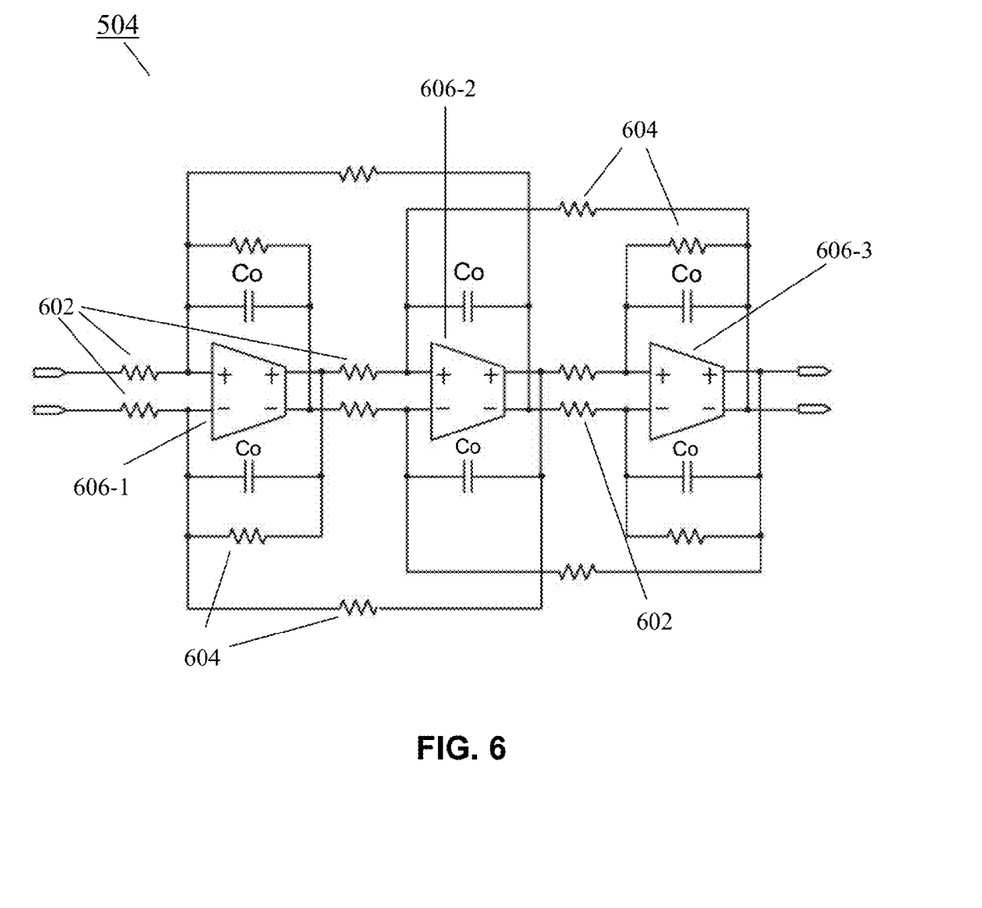
FIG. 6 is a schematic diagram of an example low-pass filter architecture that can be used in an adaptive IF filter according to embodiments of the invention.

FIG. 6 is a schematic diagram of one example third order Leapfrog OpAmp-RC low-pass filter 504 according to embodiments of the invention. Note that the input and feedback resistors 602, 604 in this filter have been made programmable in this embodiment order to integrate the variable gain amplification (VGA) function shown in FIGS. 2A and 3A into the low-pass filter. The integrating capacitors $C_0$ are also variable for RC calibration of the low-pass filter, and for varying the complex filter bandwidth, as mentioned previously.

The adaptive IF filter using the example filter shown in FIG. 6 is designed for two wideband LPF modes with different bandwidths. For example, one wider bandwidth can be designed to capture all baseband signals of interest, while another narrower bandwidth can be used to capture only a subset of the baseband signals. In these modes, the cross-coupling paths between filters 504-A and 504-B through block 506 are disabled by signals from block 402. The bandwidth of the LPF 504 is adjusted by varying the capacitance $C_0$ under control of signals from block 402.

To implement a narrowband complex BPF 510, the cross-coupling paths between filters 504-A and 504-B through block 506 are enabled by signals from block 402. In embodiments, the inputs and outputs of each respective op-amp 606-1, 606-2 and 606-3 between filters 504-A and 504-B are cross-coupled. For example, the positive input of op-amp 606-1 in filter 504-A is coupled to the positive output of op-amp 606-1 in filter 504-B, the negative input of op-amp 606-1 in filter 504-A is coupled to the negative output of op-amp 606-1 in filter 504-B, the positive output of op-amp 606-1 in filter 504-A is coupled to the negative input of op-amp 606-1 in filter 504-B and the negative output of op-amp 606-1 in filter 504-A is coupled to the positive input of op-amp 606-1 in filter 504-B. Similar cross-coupling is performed for op-amps 606-2 and 606-3. The center frequency of the narrowband mode is further adjusted for the desired baseband signal by selecting appropriate resistance values in the switched resistance block 506, controlled by signals from block 402.

In embodiments, the current for each mode is optimized to meet the OpAmps gain bandwidth requirement for a given filter bandwidth. According to aspects of the invention, the narrower filter used to form the complex band-pass filter 510 requires less current than the wideband low-pass filter 504 options.

Although the filter implementation described above is a Opamp-RC topology, the invention could also be implemented with Gm-C filter or other filter architectures. The implementation of the low-pass to complex band-pass translation and cross-coupling method will differ by topology. Opamp-RC offers good linearity, and so is preferred in implementations where linearity is desired.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. An intermediate frequency (IF) filter for a multiband global navigation satellite system (GNSS) receiver, comprising:
a wideband filter configured to pass a plurality of signals from different GNSS systems for allowing all of the plurality of signals to be converted to baseband; and
cross coupling elements configured to convert the wideband filter into a narrowband complex bandpass filter configured to pass fewer than the plurality of signals for conversion to baseband.

2. An IF filter according to claim 1, wherein the narrowband complex bandpass filter consumes less current than the wideband filter.

3. An IF filter according to claim 1, wherein the wideband filter comprises a pair of low pass filters respectively coupled to in-phase and quadrature signals corresponding to the plurality of signals, and wherein the cross-coupling elements are operatively coupled between the pair of low pass filters.

4. An IF filter according to claim 3, wherein each of the low pass filters comprises an Op Amp-RC filter.

5. An IF filter according to claim 4, wherein the Op Amp-RC filter has a Leapfrog topology.

6. An IF filter according to claim 4, wherein each of the low pass filters comprise variable capacitors coupled in feedback paths of Op Amps comprising the Op Amp-RC filter.

7. An IF filter according to claim 4, wherein each of the low pass filters comprise variable resistors coupled in feedback and input paths of Op Amps comprising the Op Amp-RC filter.

8. An IF filter according to claim 3, wherein the cross-coupling elements comprise a switched resistor block coupled between the pair of low pass filters.

9. An IF filter according to claim 1, wherein the cross-coupling elements comprise a switched resistor block.

10. An IF filter according to claim 1, wherein the plurality of signals comprise two or more of GPS, GLONASS, BDS and Galileo signals.

11. An intermediate frequency (IF) filter for a multiband global navigation satellite system (GNSS) receiver, comprising:
a wideband filter congifured to pass a plurality of signals from different GNSS systems;
cross coupling elements configured to convert the wideband filter into a narrowband complex bandpass filter configured to pass fewer than the plurality of signals; and
a detector configured to detect interference within a passband of the wideband filter and configured to cause the cross-coupling elements to convert the wideband filter into the narrowband complex bandpass filter in response to detected interference.

12. An IF filter according to claim 11, wherein the detector is further configured to select a center frequency of the narrowband complex bandpass filter in response to the detected interference and configured to cause the cross coupling elements to convert the wideband filter into the narrowband complex bandpass filter having that center frequency.

13. An IF filter according to claim 11, wherein the detector is further configured to select a bandwidth of the narrowband complex bandpass filter in response to the detected interference and configured to cause the cross-coupling elements to convert the wideband filter into the narrowband complex band-pass filter having that bandwidth.

14. An IF filter according to claim 11, wherein the cross-coupling elements comprise a switched resistor block, and wherein the detector is configured to select a resistance within the switched resistor block in response to the detected interference.

15. An intermediate frequency (IF) filter for a multiband global navigation satellite system (GNSS) receiver, comprising:
a first low pass Op Amp-RC filter coupled to in-phase signals corresponding to a plurality of different GNSS systems;
a second low pass Op Amp-RC filter coupled to quadrature signals corresponding to the plurality of different GNSS systems; and
a switched resistor block operatively coupled between the first and second low pass Op Amp-RC filters,
wherein in a first mode of operation, the switched resistor block is configured to provide an open circuit between the first and second low pass Op Amp-RC filters so that they together have a wide passband that passes signals from all of the plurality of different GNSS systems, and
wherein in a second mode of operation, the switched resistor block is configured to provide a resistive coupling between the first and second low pass Op Amp-RC filters so that they together have a narrower bandpass response that passes signals from fewer than all of the plurality of different GNSS systems, and
wherein the first and second low pass Op Amp-RC filters have a Leapfrog topology.

16. An IF filter according to claim 15, further comprising:
a detector configured to detect interference within the wide passband during the first mode of operation and configured to cause the switched resistor block to provide the resistive coupling for the second mode of operation in response to detected interference.

17. An IF filter according to claim 16, wherein the detector is further configured to select a center frequency of the narrower bandpass response in response to the detected interference and is configured to cause the switched resistor block to selectively provide an amount of the resistive coupling corresponding to that center frequency.

18. An IF filter according to claim 16, wherein the detector is further configured to select a bandwidth of the narrower bandpass response in response to the detected interference and configured to cause the switched resistor block to selectively provide an amount of the resistive coupling corresponding to that bandwidth.

19. An IF filter according to claim 15, wherein the plurality of different GNSS systems comprise two or more of GPS, GLONASS, BDS and Galileo.

* * * * *